UNITED STATES PATENT OFFICE.

ANDREW J. GRAUEL, OF PHILADELPHIA, PENNSYLVANIA, ASSIGNOR TO HIMSELF AND LAFAYETTE GRAUEL, OF SAME PLACE.

IMPROVEMENT IN COMPOSITIONS FOR COATING COFFEE.

Specification forming part of Letters Patent No. 175,970, dated April 11, 1876; application filed January 8, 1876.

*To all whom it may concern:*

Be it known that I, ANDREW J. GRAUEL, of the city and county of Philadelphia and State of Pennsylvania, have invented a new and useful Compound for Preventing Deterioration of Roasted Coffee; and I do hereby declare the following to be a clear and exact description of the nature thereof, sufficient to enable others skilled in the art to which my invention appertains to fully understand, make, and use the same.

In carrying out my invention I take, for 100 pounds of roasted coffee, 3 ounces of dextrine, 8 ounces of corn-meal or wheat-flour, 1 ounce of cocoa, and add thereto a sufficient quantity of water to form a pasty mass, the parts being thoroughly incorporated, preferably by boiling, the mass being of the color of coffee. Before the coffee is removed from the roasting-cylinder, the roasting being completed, I pour the compound as prepared on the roasted coffee, and again rotate the cylinder for a sufficient time, whereby the coffee will receive a coating which is highly glossy in its nature, and it envelopes the surface thereof so that the aroma cannot escape, whereby there will be no evaporation and consequent deterioration of the coffee, and the flavor of the beverage will be correspondingly improved, the cocoa imparting a proper color to the dextrine similar to coffee, and agreeably altering the flavor of the dextrine. The cocoa and dextrine readily unite and produce a compound that will uniformly coat the coffee.

Having thus described my invention, what I claim as new and desire to secure by Letters Patent, is—

The composition of matter for coating coffee, consisting of dextrine, corn-meal or wheat-flour, cocoa, and water, substantially as set forth.

ANDREW J. GRAUEL.

Witnesses:
 JOHN A. WIEDERSHEIM,
 P. V. DIEDINE.